(12) United States Patent
Mihály et al.

(10) Patent No.: US 12,182,925 B2
(45) Date of Patent: Dec. 31, 2024

(54) SPLIT RENDERING FOR EXTENDED REALITY (XR) APPLICATIONS

(71) Applicant: Telefonaktiebolaget LM Ericsson (publ), Stockholm (SE)

(72) Inventors: Attila Mihály, Dunakeszi (HU); Bence Formanek, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 86 days.

(21) Appl. No.: 18/012,515

(22) PCT Filed: Aug. 5, 2020

(86) PCT No.: PCT/EP2020/071947
§ 371 (c)(1),
(2) Date: Dec. 22, 2022

(87) PCT Pub. No.: WO2022/028684
PCT Pub. Date: Feb. 10, 2022

(65) Prior Publication Data
US 2023/0260191 A1    Aug. 17, 2023

(51) Int. Cl.
*G06T 15/00*  (2011.01)
*G06F 3/01*   (2006.01)
(Continued)

(52) U.S. Cl.
CPC .............. *G06T 15/00* (2013.01); *G06F 3/012* (2013.01); *G06T 7/20* (2013.01); *H04N 19/29* (2014.11);
(Continued)

(58) Field of Classification Search
CPC ......... G06F 3/011; G06F 3/012; H04N 19/29; G06T 7/20; G06T 15/00; G06T 2210/08; G06T 2207/10016
(Continued)

(56) References Cited

U.S. PATENT DOCUMENTS 10,446,119 B1 * 10/2019  Lakshmikantha ..... G09G 3/003
2010/0127968 A1 * 5/2010  Kramer ................. G06F 3/017
                                                                  345/156
(Continued)

FOREIGN PATENT DOCUMENTS

WO    2019212643 A1    11/2019
WO    2020068406 A1    4/2020

OTHER PUBLICATIONS

Reinert B, Kopf J, Ritschel T, Cuervo E, Chu D, Seidel HP. Proxy-guided image-based rendering for mobile devices. InComputer Graphics Forum Oct. 2016 (vol. 35, No. 7, pp. 353-362).*

*Primary Examiner* — Phu K Nguyen
(74) *Attorney, Agent, or Firm* — Murphy, Bilak & Homiller, PLLC

(57) ABSTRACT

A method (20, 40) for reducing undesirable visual effects, such as judder, in a video image having one or more frames is disclosed. A server node (16) generates graphics layers from 3D objects, and augments the layers with the Z-layer information and motion information for the objects. The server node then groups (28, 30, 32) the graphics layers, encodes (34) the groups into a video stream such that every video frame of the stream is a composite video frame of the graphics layers, adds (36) the motion information to the composite video frame, and sends (38) the stream to a client device (18). Upon receipt, the client device extracts (44) the motion information, compensates the positions of the graphics layers using the Z-layer information and the motion information, and applies a selected positional time-warp algorithm to compensate for the translational and rotational movement of the user's head (50). The resultant layers are then combined into a video image and rendered (52) for the user.

8 Claims, 7 Drawing Sheets

(51) Int. Cl.
  *G06T 7/20* (2017.01)
  *H04N 19/29* (2014.01)
(52) U.S. Cl.
  CPC  *G06T 2207/10016* (2013.01); *G06T 2210/08* (2013.01)
(58) Field of Classification Search
  USPC ........................................................ 345/418
  See application file for complete search history.

(56) References Cited

U.S. PATENT DOCUMENTS

| | | | |
|---|---|---|---|
| 2014/0359508 A1* | 12/2014 | Otero Diaz | G06F 3/04883 715/771 |
| 2016/0018896 A1* | 1/2016 | Kramer | G06F 9/544 345/156 |
| 2016/0070755 A1* | 3/2016 | Kramer | G06F 9/52 707/760 |
| 2017/0346792 A1* | 11/2017 | Nataros | H04L 63/0428 |
| 2017/0346864 A1* | 11/2017 | Nataros | H04L 65/70 |
| 2018/0048888 A1* | 2/2018 | Zhao | H04N 19/103 |
| 2023/0260191 A1* | 8/2023 | Mihály | G06F 3/011 345/419 |

\* cited by examiner

SPLIT RENDERING FOR EXTENDED REALITY (XR) APPLICATIONS

TECHNICAL FIELD

The present disclosure relates generally to eXtended Reality (XR) applications, and more particularly, to an improved split-rendering process for reducing or eliminating undesirable visual effects, such as judder, in XR applications.

BACKGROUND

The quality of a video image is very important in a variety of applications. Often, however, various undesirable "visual artifacts" can decrease the quality of a video image. One example of an undesirable "visual effect" is judder.

Judder is a perceptual effect. Generally defined, judder is a combination of smearing and strobing that can significantly reduce the visual quality on a Virtual Reality (VR) headset (e.g., a head mounted display—HMD). It usually occurs when a game that a user is playing cannot maintain a desired frame rate. In order to correct for this, the game renders the same image twice instead of rendering a new image. However, as the user moves his/her head and eyes, the light from the subsequently rendered images fall on a different part of the user's retina. This results in the user seeing a double image.

There are some techniques that have been developed to diminish the effect of judder. One such technique is referred to as "asynchronous time-warp," which generates intermediate frames in situations when the game is unable maintain frame rate. This technique warps the rendered image before sending it to a display (e.g., the HMD worn by the user) thereby correcting for head motion that occurs after a scene is rendered. In essence, this technique helps to reduce perceived latency.

A more basic version of the asynchronous time-warp technique is referred to as "orientation-only time-warp." With this technique, only the rotational movement of the user's head is corrected for based on HMD rotational data.

Another technique for reducing judder is referred to as the "positional time-warp" technique. In general, the positional time-warp technique is an extension of the broader time-warp techniques, and thus, also reduces perceived latency. However, the positional time-warp technique can also compensate for the user's translational head movement by displacing parts of the image depending on depth information.

Yet another technique, referred to as "asynchronous space-warp" technique, generates extrapolated frames from previous frames generated by a Virtual Reality (VR) application based on sensor data received from the user's HMD. This technique is generally a frame-rate smoothing technique that can reduce the amount of CPU/GPU time that is required to produce similar output from the same content. The difference between the asynchronous space-warp technique and the so-called time-warp techniques is that the asynchronous space-warp technique generates a new frame where the time-warp techniques shift an existing frame based on extrapolation using movement information related to the movement. Such movement includes, but is not limited to, the movement of a game character (or any object in a game being rendered to a user), a camera that is capturing images to be rendered to the user, a touch-sensitive controller, and the user's own movement. Currently, time-warp and space-warp techniques can be used in parallel.

A method for split rendering is described in U.S. Pat. No. 10,446,119 entitled "Method for Supporting Multiple Layers in Split Rendering." In this method, a rendered image is split into a number of different graphics layers known as "Z-layers" to reduce video stream bandwidth. Layers that change less frequently are sent to a decoder with lower framerate, while layers that change more frequently are sent to the decoder with a higher framerate.

Recently developed XR applications (i.e., both Virtual Reality (VR) and Augmented Reality (AR) applications) place critical rendering processes in a remote cloud processing environment, such as an Edge Cloud (EC), for example. Such schemes, which are commonly referred to as "remote rendering," place the processing power needed by these applications close to the client location (e.g., an HMD), thereby working to improve response times and preserve bandwidth. Some example XR applications that utilize the EC are those related to gaming and training.

SUMMARY

Embodiments of the present disclosure provide an improved split-rendering process for reducing undesirable visual artifacts, such as judder, for example, in a video image having one or more frames.

In a first aspect, a method for reducing undesirable visual artifacts in a video image having one or more composite frames is implemented by a server node in an Edge Data Network (EDN) and comprises creating a plurality of graphics layers comprising one or more objects by rendering the one or more objects to a number of different Z-order planes, grouping the plurality of graphics layers into graphics layer groups based on the Z-order of the graphics layers and motion information for the one or more objects, encoding the graphics layer groups separately into a composite video frame such that each graphics layer group is separately decodable and the composite video frame includes the motion information, and sending the composite video frame to a decoder.

In a second aspect, the method for reducing undesirable visual artifacts in a video image having one or more composite frames is implemented by a client device. In this aspect, each composite video frame includes a plurality of graphics layers arranged in graphics layer groups, motion information for one or more objects in the plurality of graphics layers, and Z-order information associated with the plurality of graphics layers. The method comprises the client device extracting the motion information from a composite video frame, and separately decoding each graphics layer group in the composite video frame into the plurality of graphics layers. Then, for each of the one or more objects in the plurality of graphics layers, the method comprises the client device compensating for motion of the object based on the motion information for the object and compensating the object for movement of a user's head based on the Z-order information, and rendering the plurality of graphics layers on a display to the user.

In a third aspect, the present disclosure provides a server node in an Edge Data Network (EDN) for reducing undesirable visual artifacts in a video image having one or more frames. In this aspect, the server node is configured to create a plurality of graphics layers comprising one or more objects by rendering the one or more objects to a number of different Z-order planes, group the plurality of graphics layers into graphics layer groups based on the Z-order of the graphics layers and motion information for the one or more objects, encode the graphics layer groups separately into a composite video frame such that each graphics layer group is separately decodable and the composite video frame includes the motion information, and send the composite video frame to a decoder.

In a fourth aspect, the present disclosure provides a server node in an Edge Data Network (EDN) for reducing undesirable visual artifacts in a video image having one or more frames. In this aspect, the server node comprises communications interface circuitry and processing circuitry. The communications interface circuitry is configured to communicate with a client device operatively connected to the EDN. The processing circuitry configured to create a plurality of graphics layers comprising one or more objects by rendering the one or more objects to a number of different Z-order planes, group the plurality of graphics layers into graphics layer groups based on the Z-order of the graphics layers and motion information for the one or more objects, encode the graphics layer groups separately into a composite video frame such that each graphics layer group is separately decodable and the composite video frame includes the motion information, and send the composite video frame to a decoder.

In a fifth aspect, the present disclosure provides a non-transitory computer-readable storage medium having a computer program comprising executable instructions stored thereon that, when executed by a processing circuitry of a server node in an Edge Data Network (EDN), causes server node to create a plurality of graphics layers comprising one or more objects by rendering the one or more objects to a number of different Z-order planes, group the plurality of graphics layers into graphics layer groups based on the Z-order of the graphics layers and motion information for the one or more objects, encode the graphics layer groups separately into a composite video frame such that each graphics layer group is separately decodable and the composite video frame includes the motion information, and send the composite video frame to a decoder.

In a sixth aspect, the present disclosure provides a client device for reducing undesirable visual artifacts in a video image having one or more frames. In this aspect, the client is configured to create a plurality of graphics layers comprising one or more objects by rendering the one or more objects to a number of different Z-order planes, group the plurality of graphics layers into graphics layer groups based on the Z-order of the graphics layers and motion information for the one or more objects, encode the graphics layer groups separately into a composite video frame such that each graphics layer group is separately decodable and the composite video frame includes the motion information, and send the composite video frame to a decoder.

In a seventh aspect, the present disclosure provides a client device for reducing undesirable visual artifacts in a video image having one or more frames. In this aspect, the client device comprises communications interface circuitry and processing circuitry. The communications interface circuitry is configured to communicate with a client device operatively connected to the EDN. The processing circuitry is configured to create a plurality of graphics layers comprising one or more objects by rendering the one or more objects to a number of different Z-order planes, group the plurality of graphics layers into graphics layer groups based on the Z-order of the graphics layers and motion information for the one or more objects, encode the graphics layer groups separately into a composite video frame such that each graphics layer group is separately decodable and the composite video frame includes the motion information, and send the composite video frame to a decoder.

In an eighth aspect, the present disclosure provides a non-transitory computer-readable storage medium having a computer program comprising executable instructions stored thereon that, when executed by a processing circuit of a client device, causes client device to extract the motion information from a composite video frame, separately decode each graphics layer group in the composite video frame into the plurality of graphics layers, for each of the one or more objects in the plurality of graphics layers compensate for motion of the object based on the motion information for the object and compensate the object for movement of a user's head based on the Z-order information, and render the plurality of graphics layers on a display to the user.

DETAILED DESCRIPTION

Figure 1:
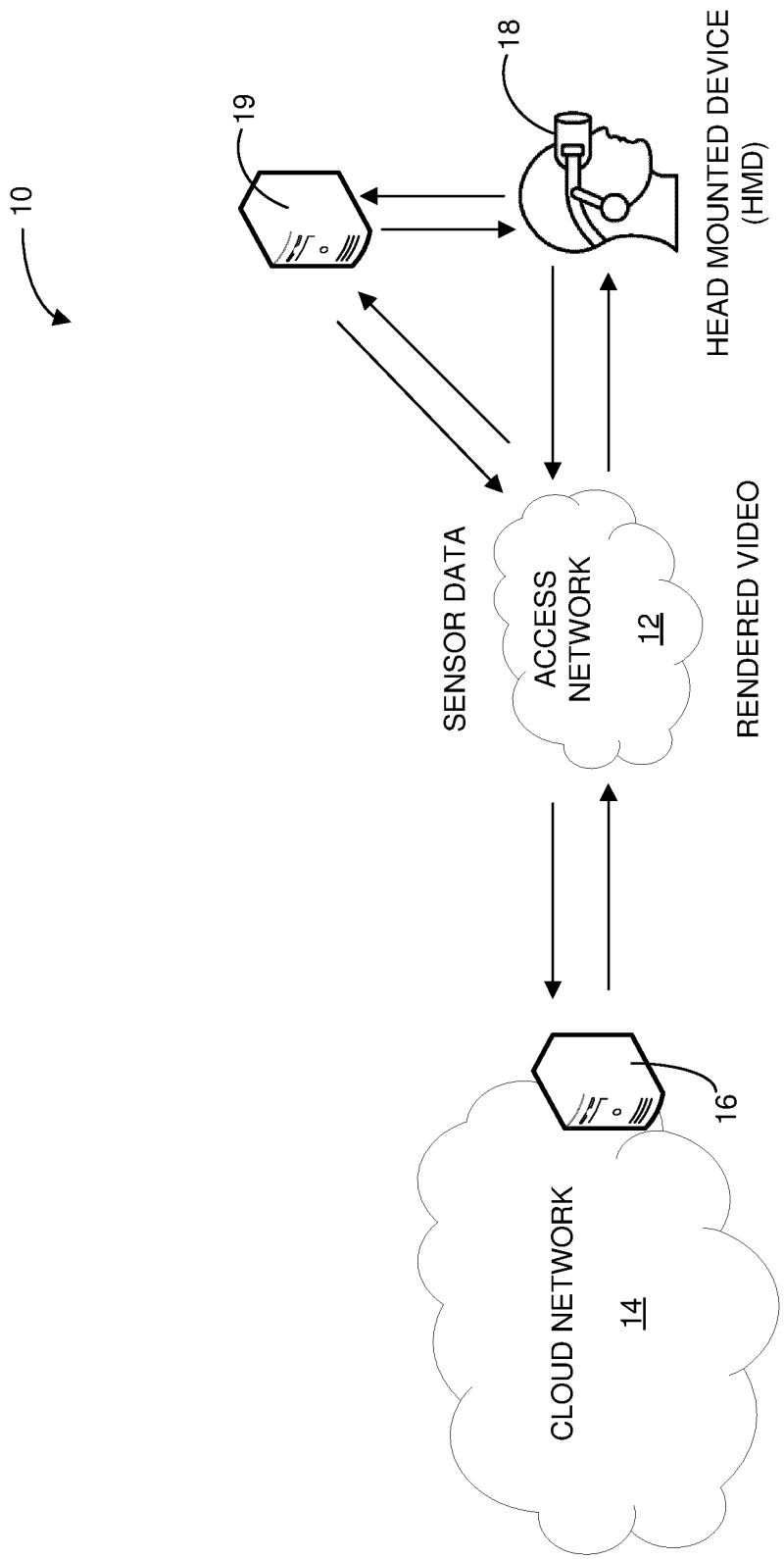
FIG. 1 is a functional block diagram illustrating a communications system configured according to one embodiment of the present disclosure.

Time-warp technology is very useful in helping to prevent or minimize some undesirable side effects (e.g., motion sickness) experienced by users using HMDs. This is true even when the XR applications render the graphics locally.

However, when a client device like an HMD is unable to maintain a given framerate, time-warp technologies has some well-known problems.

For example, asynchronous time-warp techniques perform 2D transformation. Therefore, asynchronous time-warp techniques can only correct for the changes caused by the rotational movement of a user's head. They do not compensate for translational head movement, thereby causing an undesirable visual artifact known as positional judder. This effect is generally very noticeable by users in spaces with near field objects.

Positional time-warp techniques, however, are able to compensate for the translational movement of the user's head. Although this technique does reduce positional judder, it also uses a single image as a source, which can cause disocclusion artifacts in the image. Disocclusion is a term commonly understood to those in the graphics art, and is used to describe a situation where a first object in the image, previously occluded by a second object in the image, becomes visible. More particularly, as an object in a video image moves, the processing logic for whichever technique is being employed (e.g., the positional time-warp technique or the asynchronous space warp technique) needs something to fill the space the object leaves behind (i.e., the space that was previously occluded by the object before it moved). However, these techniques are not capable of knowing what is going to fill the previously occluded space. Therefore, they stretch or "warp" the part of the image that was not occluded in order to fill the previously occluded space. Regardless of the particular technique used, however, moving objects still causes judder artifacts because the warped image is created without knowledge of the motion of the object.

One notable aspect of remote rendering by XR applications is that of "interaction latency." Interaction latency is defined as the time between when a user presses a button or moves the HMD or controller, and when the resultant video image is updated on the display of the HMD. Typically, interaction latency is higher for XR applications with local rendering (generally, on the order of 80-100 ms higher). This higher interaction latency, however, indicates the degradation of the user's experience. Hence, the motivation to use the Edge Cloud (EC) for remote rendering.

The "motion to photon" latency requirement (i.e., the time between when the user moves his/her head and the time when the resultant video image is updated on the display of the HMD), is much shorter (on the order of about 20 ms). This means that for remote rendering, time-warp techniques must be applied to compensate for head movement, even in normal scenarios (that is, even in situations where there are no delayed or lost frames). Therefore, minimizing the problems related to time-warp techniques is crucial for XR applications with remote rendering.

The improved split-rendering process of the present disclosure addresses these issues. In particular, embodiments of the present disclosure configure a server node and a client node to reduce undesirable visual artifacts in a video image having one or more frames. One such undesirable visual artifact is "judder." More particularly, a graphics application such as a game engine, for example, executes on the server node, which is disposed in an Edge Data Network (EDN). The game engine generates graphics layers from 3D objects, and augments the layers with the Z-layer information and motion information, such as the velocity and direction of motion of the 3D objects. The server node then encodes the graphics layers into a video stream such that every video frame of the stream is a composite video frame of the graphics layers. The encoded video stream is then sent to a decoder, such as the decoder in a client device.

Upon receipt, the client device (e.g., an HMD worn by a user) extracts the motion information from a composite video frame and decodes the composite video frame. The client device compensates the positions of the graphics layers using the Z-layer information and the motion information, and applies a selected positional time-warp algorithm to compensate for the translational and rotational movement of the user's head. The resultant layers are then combined into a video image and displayed to the user on the HMD.

The improved split-rendering technique described in the following embodiments provides advantages and benefits not achieved by conventional split-rendering methods. For example, the improved split-rendering technique of the present embodiments improves the quality of rendering and diminishes or eliminates problems associated with "time-warp" judder. This is especially useful for applications using remote rendering.

In another benefit, the improved positional time-warp of the present embodiments use the graphic layer information to reduce or eliminate the undesirable effects of disocclusion. Additionally, the present embodiments use the motion information added to graphics layers to diminish judder caused by the moving objects. This eliminates the need to perform space-warp processing on a video image, thereby reducing the processing at the client device in cases where remote rendering is performed.

It should be noted that the following aspects of the present disclosure are discussed in terms of reducing or eliminating an undesirable visual effect known as "judder." However, this is merely for illustrative purposes and ease of discussion. Those of ordinary skill in the art will readily appreciate that the present disclosure is not limited solely to the reduction or elimination of judder, but rather, may be applied to reduce or limit undesirable visual effects in addition to, or in lieu of, judder.

Turning now to the drawings, FIG. 1 illustrates a communications network 10 configured according to one embodiment of the present disclosure. As seen in FIG. 1, network 10 comprises an access network 12 communicatively connecting a client device (e.g., a HMD 18) with a server node 16 disposed in a cloud network 14. In some embodiments, a computing device 19 is disposed between HMD 18 and server node 14, and is configured to perform at least some of the processing functions of HMD 18.

The access network 12 may be any type of communications network (e.g., WiFi, ETHERNET, Wireless LAN (WLAN), 3G, LTE, etc.), and functions to connect subscriber devices, such as HMD 18, to one or more service provider nodes, such as server node 16. The cloud network 14 provides such subscriber devices with "on-demand" availability of computer resources (e.g., memory, data storage, processing power, etc.) without requiring the user to directly, actively manage those resources. According to embodiments of the present disclosure, such resources include, but are not limited to, one or more XR applications being executed on server node 16. The XR applications may comprise, for example, gaming applications and/or simulation applications used for training.

In general, one or more sensors (not shown) on HMD 18 measure the translational and/or rotational movement of the user's head as the user views images rendered by server node 16 on HMD 18. Signals representing the detected and measured movement are then sent to server node 16. Upon receipt, server node 16 utilizes those signals to compensate the video images for the user's movement, and sends the compensated video to HMD 18. To help reduce and/or eliminate latency associated with the communications between HMD 18 and server node 116, the present embodiments place server node 16 in an Edge Data Network (EDN).

Figure 2:
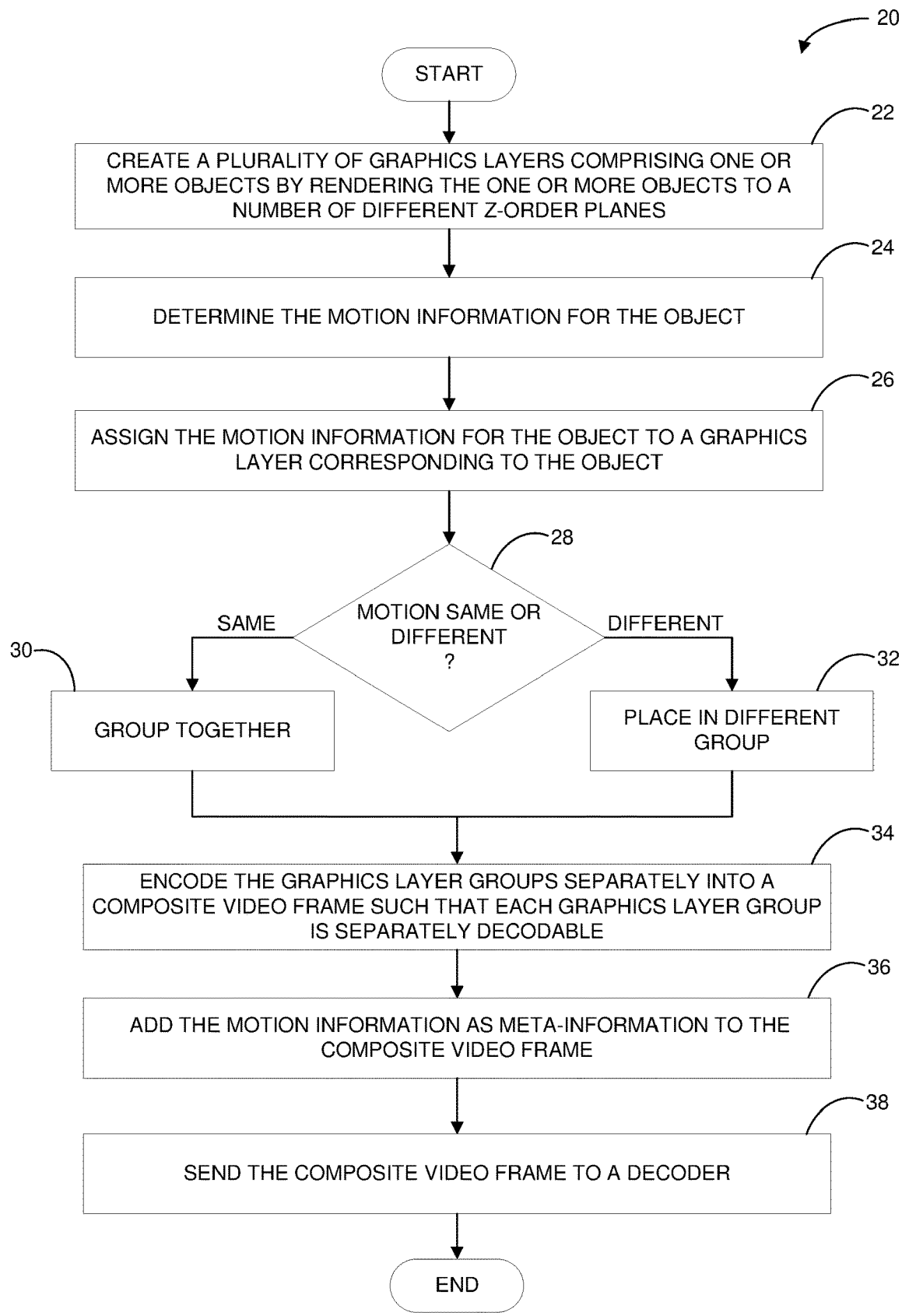
FIG. 2 is a flow chart illustrating a method, implemented at a server node in an Edge Data Network (EDN), for reducing undesirable visual artifacts, such as judder, in a video image according to one embodiment of the present disclosure.

FIG. 2 is a flow chart illustrating a method 20 for reducing undesirable visual artifacts, such as judder, in a video image according to one embodiment of the present disclosure. In this embodiment, method 20 is implemented by an XR application executing at server node 16.

Generally, the server node 16 functions to generate ordered graphics layer groups based on the Z-order of the graphics layers and motion information. In more detail, the XR application executing on server node 16 creates a plurality of graphics layers, each of which comprises one or more 3D objects, by rendering those 3D objects to a number of different, Z-order planes (box 22). For example, in one embodiment, server node 16 renders the 3D objects to the Z-order planes based on their Z-order distance from a rendering camera. Server node 16 then uses well-known techniques to determine the motion information for the objects (i.e., the velocity and the direction of movement of the 3D objects) (box 24), and assigns the determined motion information for each 3D object to the graphics layer corresponding to that 3D object (box 26). Once assigned, server node 16 determines whether or not to group the plurality of graphics layers into graphics layer groups.

In this embodiment, for example, server node 16 determines whether to group the different graphics layers based on the Z-order of the graphics layer and the motion information associated with that graphics layer. To accomplish this, one embodiment of the present disclosure configures server node 16 to compare the motion information for the different graphics layers (box 28). Graphics layers on the same Z-order plane are grouped together if they have the same motion information (box 30). Graphics layers on the same Z-order plane having different motion information, however, are grouped together, but rather, are put into separate groups (box 32).

Once the graphics layers are grouped, server node 16 assembles a composite video frame from the graphics layer groups. Particularly, in this embodiment, server node 16 encodes the graphics layer groups separately into the composite video frame ensuring that each graphics layer group is separately decodable independently of the other graphics layer groups (box 34), and then adds the motion information for the graphics layer groups as meta-information to the composite video frame (box 36). In one embodiment, for example, server node 16 adds the motion information to the beginning of the composite video frame so that a client device can extract the information upon receipt of the composite video frame. Once the composite video frame has the motion information, server node 16 sends the composite video frame to a client device having a decoder, such as HMD 18, for example (box 38).

In some embodiments, the motion information comprises a velocity vector and a direction of motion vector for each of the one or more objects.

Additionally, in some embodiments, the meta-information comprises an identity for each graphics layer in the composite video frame, the motion information for the objects in each graphics layer, and a position of each graphics layer in the composite video frame.

In some embodiments, the one or more objects are 3D objects in a video image.

In some embodiments, the number of Z-order planes is predetermined.

Figure 3:
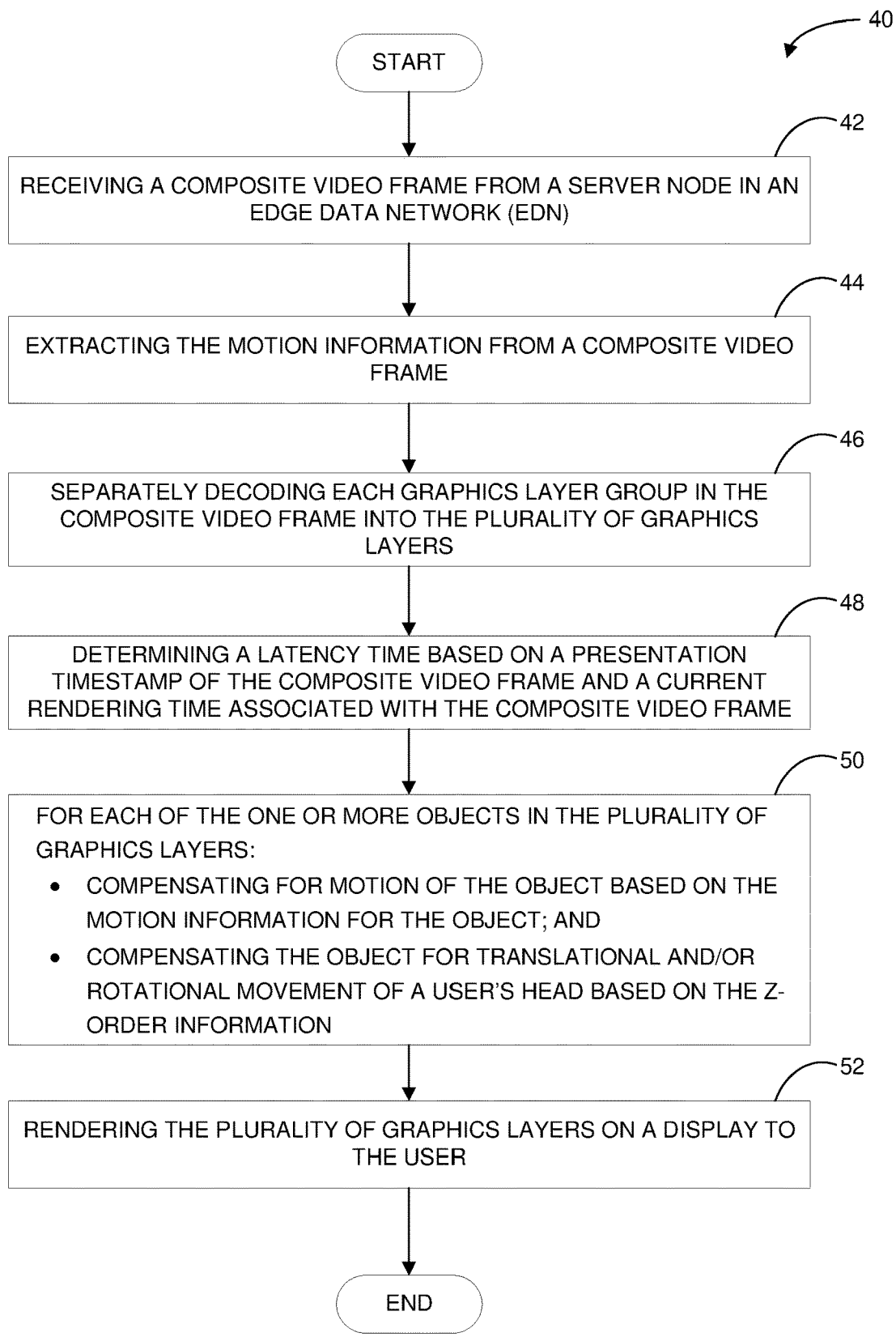
FIG. 3 is a flow chart illustrating a method, implemented at a client device connected to a server node in an Edge Data Network (EDN), for reducing undesirable visual artifacts, such as judder, in a video image according to one embodiment of the present disclosure.

FIG. 3 is a flow chart illustrating a method 40 for reducing undesirable visual artifacts, such as judder, in a video image according to one embodiment of the present disclosure. Method 40, in this embodiment, is implemented at a client device (e.g., HMD 18) connected to server node 16 in the EDN. However, those of ordinary skill in the art will readily appreciate that this is for ease of discussion only and that the present embodiments are not so limited. In some embodiments, one or more of the functions described in association with method 40 may be implemented at a local computing device 19 communicatively connected to server node 16 and HMD 18, or may be implemented by both the HMD 18 and the local computing device 19.

As seen in FIG. 3, method 40 begins with HMD 18 receiving a composite video frame sent by server node 16 (box 40). Upon receipt, HMD 18 extracts the motion information from the composite video frame (box 44), and separately decodes each graphics layer group in the composite video frame into the plurality of graphics layers (box 46). HMD 18 then determines a latency time by comparing a presentation timestamp associated with the composite video frame and a current rendering time associated with the composite video frame (box 48). In this embodiment, HMD 18 utilizes the latency time, along with the motion information (i.e., velocity information), to compensate for the positions of the graphics layers relative to each other. According to the present disclosure, the position corrections can be three dimensional. Therefore, not only can the corrections move the graphics layers in the image plane (e.g., in the 'X' 'Y' directions), but they can also move the graphics layers in the Z direction.

Next, for each of the objects in the plurality of graphics layers, HMD 18 compensates for the motion of the object based on the motion information for the object, and compensates the object for translational movement of the user's head based on the Z-order information (box 50). For example, one embodiment of the present disclosure applies a positional time-warp technique to the objects. Conventional positional time-warp techniques can cause disocclusion artifacts in cases where there is no information on the image content that becomes visible after object displacement (i.e., once a previously occluded object becomes visible). However, the positional time-warp technique of the present embodiments utilizes the Z-layer information to shift the graphics layers in the Z-plane based on the user's head movement. In this manner, there is always image information on the graphics layers that become visible (i.e., the objects that were previously occluded), thereby greatly reducing or eliminating disocclusion. Additionally, judder is also effectively reduced or eliminated because the present embodiments correct the position of the objects in the graphics layers before applying the positional time-warp.

Once compensated, the HMD 18 renders the plurality of graphics layers as a 2D image on a display of the HMD 18 for the user.

In some embodiments, compensating the object for movement of a user's head based on the Z-order information compensates for the translational and/or the rotational movement of the user's head.

Figure 4:
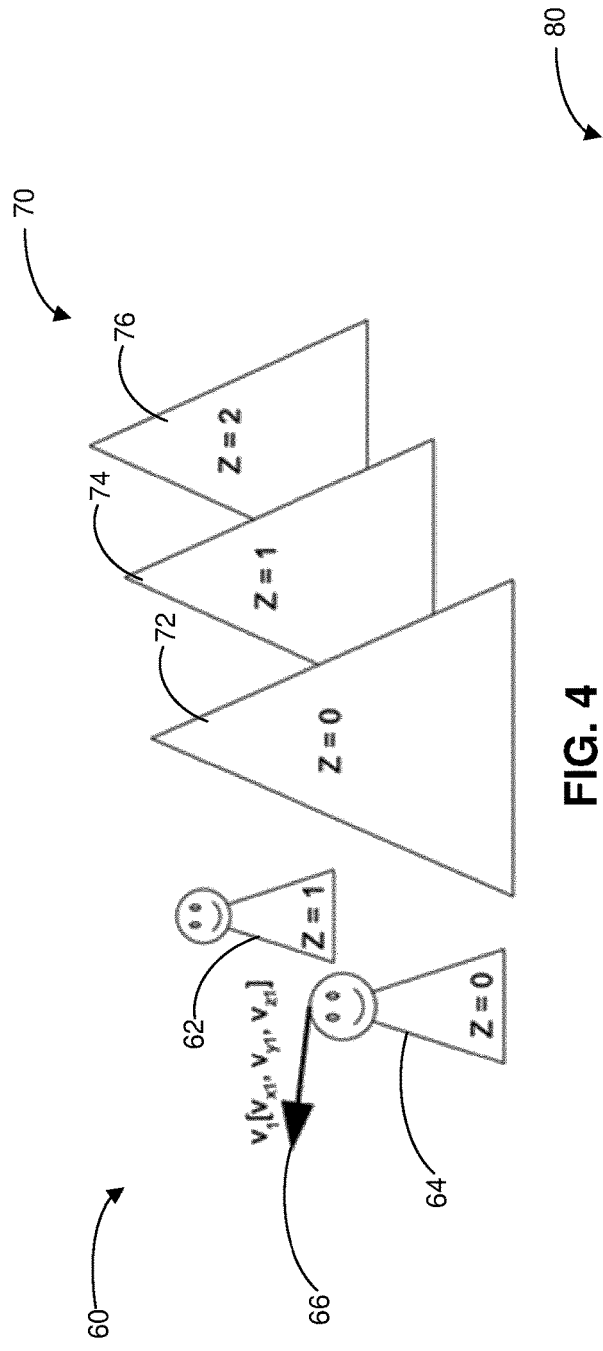
FIG. 4 illustrates objects in an image and their associated z-layers according to one embodiment of the present disclosure.
Figure 5:
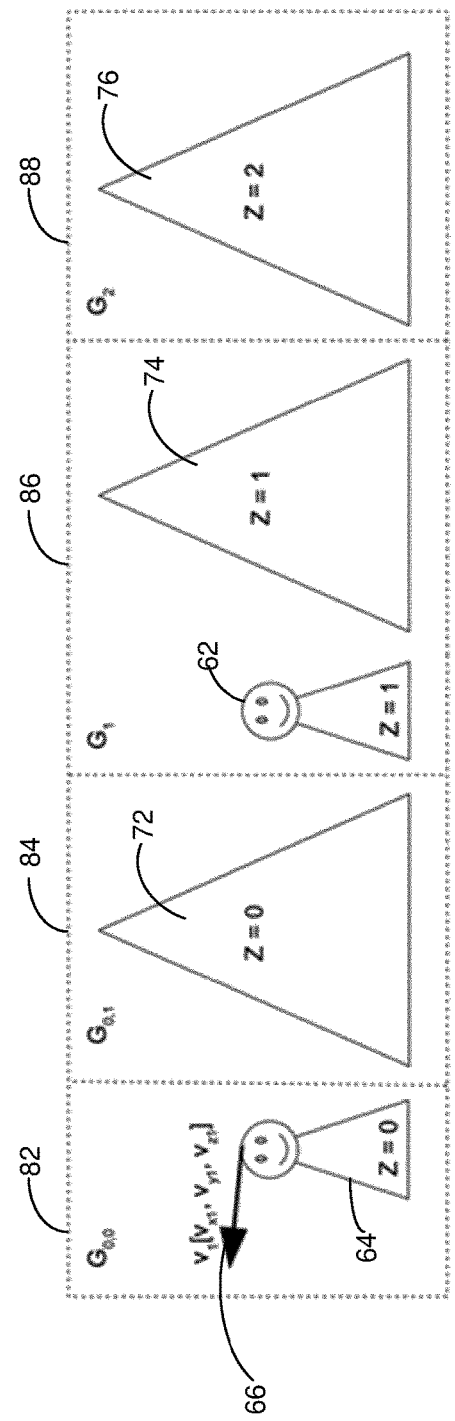
FIG. 5 illustrates groups of graphics layers created according to one embodiment of the present disclosure.

FIGS. 4-5 illustrate objects in an image, their associated Z-layers, and the resultant graphics layer groups that are generated according to one embodiment of the present disclosure. In particular, FIG. 4 illustrates the objects 62, 64 in an image 70 and the Z-layers Z=0, Z=1, and Z=2 (i.e., 72, 74, 76, respectively). As seen in FIG. 4, object 64 has a velocity vector 66 indicating that object 64 is moving in a given direction. Object 62, however, does not have a velocity vector, and therefore, is considered as being stationary in image 70.

FIG. 5 illustrates the resultant graphics layer groups 80 that are created by server node 16 based on the Z-order of the graphics layer and the motion information associated with that graphics layer. For example, as seen in FIGS. 4-5, object 64 is in Z-layer 0 along with other objects. However, object 64 has a velocity vector 66 indicating that it is moving at a velocity that is different from the other objects in Z-layer 0. Therefore, object 64 is placed into a first graphics layer group 82 while the other objects in Z-order plane=0 are placed into a different independent group 84. Object 62 and the other objects in Z-layers=1 have the same velocity, and therefore, are placed into the same group 86. Objects in Z-layer 2 are placed into their own group based on their own motion information.

Figure 6:
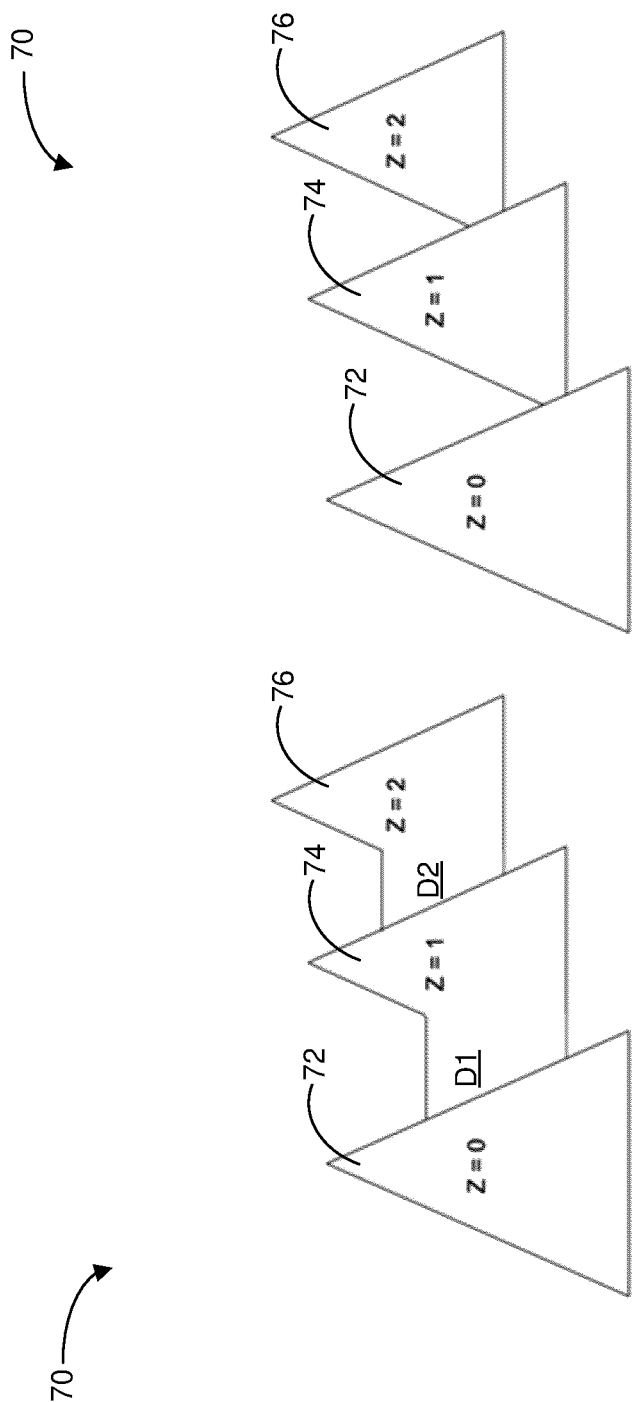
FIGS. 6A-6B illustrate z-layers after applying a time-warp technique according to one embodiment of the present disclosure.

FIGS. 6A-6B illustrate the Z-layers 72, 74, 76 after applying the positional time-warp technique according to one embodiment of the present disclosure. In particular, FIG. 6A illustrates static, overlapping objects in Z-layers 72, 74, 76 after a positional time-warp technique has been applied. In this case, the positional time-warp technique resulted in disocclusion artifacts D1, D2 after the objects in Z-layer 0 were moved because the positional time-warp technique did not use the Z-layer information. FIG. 6B, however, illustrates an embodiment where the positional time-warp technique utilized the Z-layer information according to the present disclosure, thereby eliminating the disocclusion artifacts D1 and D2.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
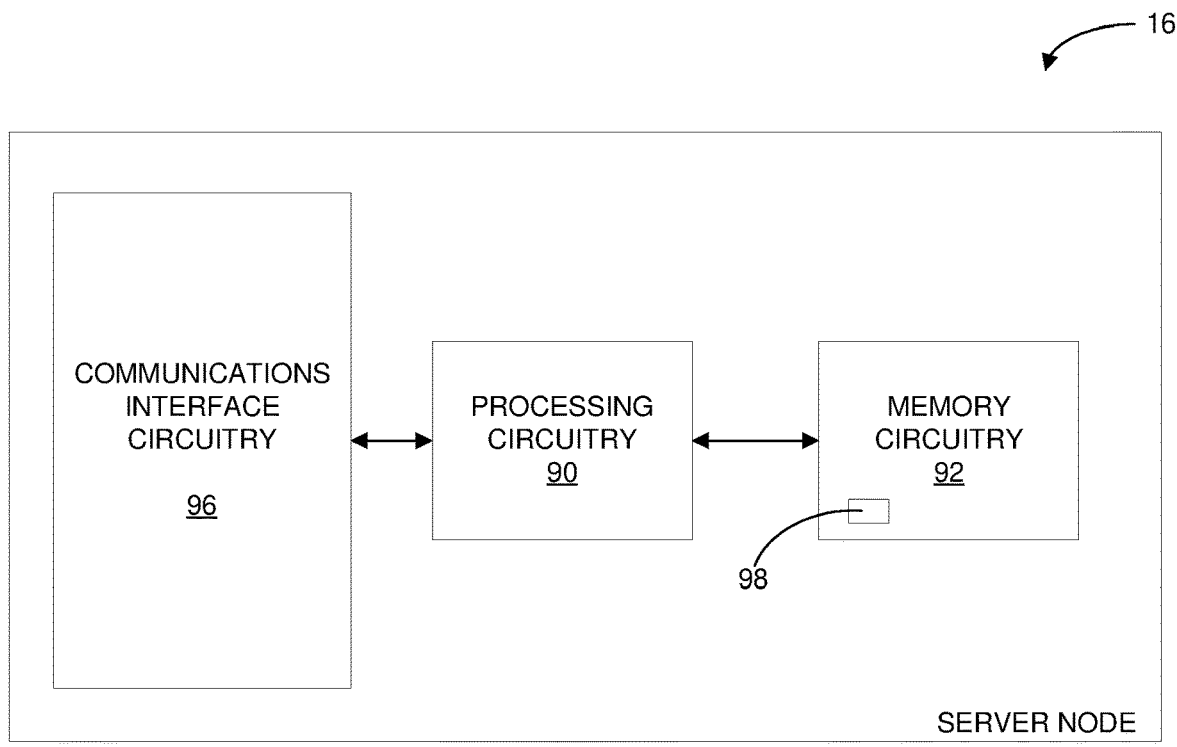
FIG. 7 is a schematic block diagram illustrating some exemplary components of a server node configured to reduce undesirable visual artifacts, such as judder, in an image according to one embodiment of the present disclosure.

FIG. 7 is a schematic block diagram illustrating some exemplary components of a server node 16 configured to reduce undesirable visual artifacts, such as judder, in an image according to one embodiment of the present disclosure. As seen in FIG. 7, server node 16 comprises processing circuitry 90, memory circuitry 92, and interface circuitry 96. As described in more detail later, a computer program 98 that configures server node 16 to operate according to the present embodiments may be stored in memory circuitry 92.

The communications interface circuitry 96 comprises network interface circuitry for communicating with other nodes in and/or communicatively connected to communication network 10. Such nodes include, but are not limited to, one or more network nodes and/or functions disposed in cloud network 14, access network 12, and one or more client devices, such as HMD 18.

Processing circuitry 90 controls the overall operation of server node 16 and is configured to perform the steps of method 20 shown in FIG. 2. Such processing may include, for example, the creation of a plurality of graphics layers by rendering objects in the layers to a number of different Z-order planes, the determination of motion information for the objects, the grouping of the graphics layers based on their Z-order and the motion information, the assembly and encoding of the graphics layer groups into a composite video frame, and the transmission of the composite video frame to HMD 18. The processing circuitry 90 may comprise one or more microprocessors, hardware, firmware, or a combination thereof.

Memory circuitry 92 comprises both volatile and non-volatile memory for storing computer program code and data needed by the processing circuitry 90 for operation. Memory circuitry 92 may comprise any tangible, non-transitory computer-readable storage medium for storing data including electronic, magnetic, optical, electromagnetic, or semiconductor data storage. Memory circuitry 92 stores computer program 98 comprising executable instructions that configure the processing circuitry 90 to implement method 20 shown in FIG. 2. A computer program in this regard may comprise one or more code modules, as is described more fully below. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 98 for configuring the processing circuitry 90 as herein described may be stored in a removable memory, such as a portable compact disc, portable digital video disc, or other removable media. The computer program 98 may also be embodied in a carrier such as an electronic signal, optical signal, radio signal, or computer readable storage medium.

Figure 8:
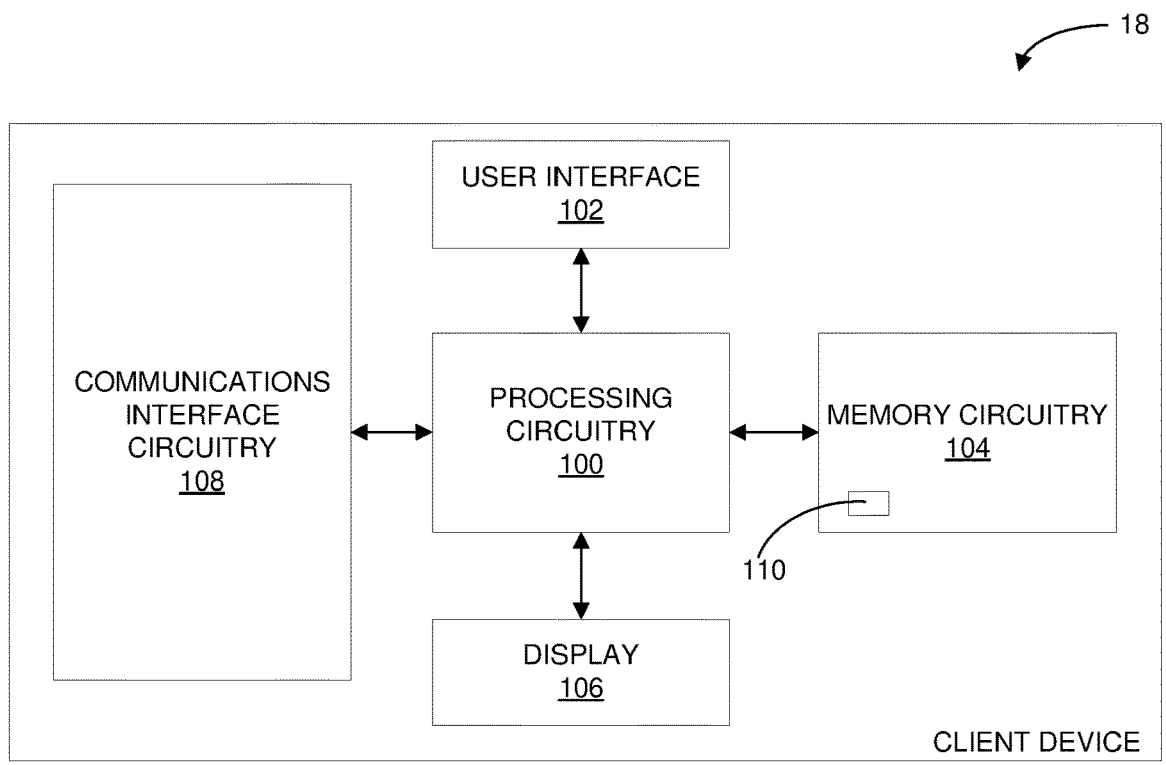
FIG. 8 is a schematic block diagram illustrating some exemplary components of a client device configured to reduce undesirable visual artifacts, such as judder, in an image according to one embodiment of the present disclosure.

FIG. 8 is a schematic block diagram illustrating some exemplary components of a client device, such as HMD 18, configured to reduce undesirable visual artifacts, such as judder, in an image according to one embodiment of the present disclosure. As seen in the figures, HMD 18 is illustrated as being a device that may be worn around the user's head or attached to a helmet, for example. However, those of ordinary skill in the art should readily appreciate that this is merely for illustrative purposes. HMD 18 may, in some embodiments, comprise a pair of glasses, a monocle, or a visor of a helmet worn by the user. Further, HMD 18 may be configured to display computer generated imagery (CGI), live imagery captured from the physical environment, or a combination of both. Regardless of its particular form, however, HMD 18 in this embodiment comprises processing circuitry 100, a user interface 102, memory circuitry 104, a display 106, and communications interface circuitry 108. As described in more detail later, a computer program 110 that configures HMD 18 to operate according to the present embodiments may be stored in memory circuitry 104.

The user interface 102 comprises one or more buttons, actuators, and software-driven controls that facilitates a user's ability to interact with and control the operation of HMD 18. The display 106 comprises one or more display devices configured to display rendered video images to a user. In this regard, the display devices may comprise, for example, Cathode Ray Tubes (CRTs), Liquid Crystal Displays (LCDs), Liquid Crystal on Silicon (LCos) displays, and Light-Emitting Diodes (LEDs). Other types of display devices not explicitly described herein may also be possible.

The communications interface circuitry 108 comprises network interface circuitry for communicating with other nodes in and/or communicatively connected to communication network 10. Such nodes include, but are not limited to, one or more network nodes and/or functions disposed in cloud network 14, such as server node 16, and access network 12. Although not specifically shown in the figures, some embodiments of the present disclosure configure HMD 18 to communicate with a local computing device that, in turn, is connected to server node 14 via access network 12.

Processing circuitry 100 controls the overall operation of HMD 18 and is configured to perform the steps of method 40 shown in FIG. 3. Such processing may include, for example, the extraction of motion information from a composite video frame received from server node 14, the decoding, separately, of each of one or more groups of graphics layers in the composite video frame, the compensation for motion of the objects in the graphics layers, as well as for the translational and/or rotational movement of the user's head, and the rendering of the graphics layers to the user. The processing circuitry 100 may comprise one or more microprocessors, hardware, firmware, or a combination thereof.

Memory circuitry 104 comprises both volatile and non-volatile memory for storing computer program code and data needed by the processing circuitry 100 for operation. Memory circuitry 104 may comprise any tangible, non-transitory computer-readable storage medium for storing data including electronic, magnetic, optical, electromagnetic, or semiconductor data storage. Memory circuitry 104 stores computer program 110 comprising executable instructions that configure the processing circuitry 100 to implement method 40 shown in FIG. 3. A computer program in this regard may comprise one or more code modules, as is described more fully below. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 110 for configuring the processing circuitry 100 as herein described may be stored in a removable memory, such as a portable compact disc, portable digital video disc, or other removable media. The computer program 110 may also be embodied in a carrier such as an electronic signal, optical signal, radio signal, or computer readable storage medium.

Figure 9:
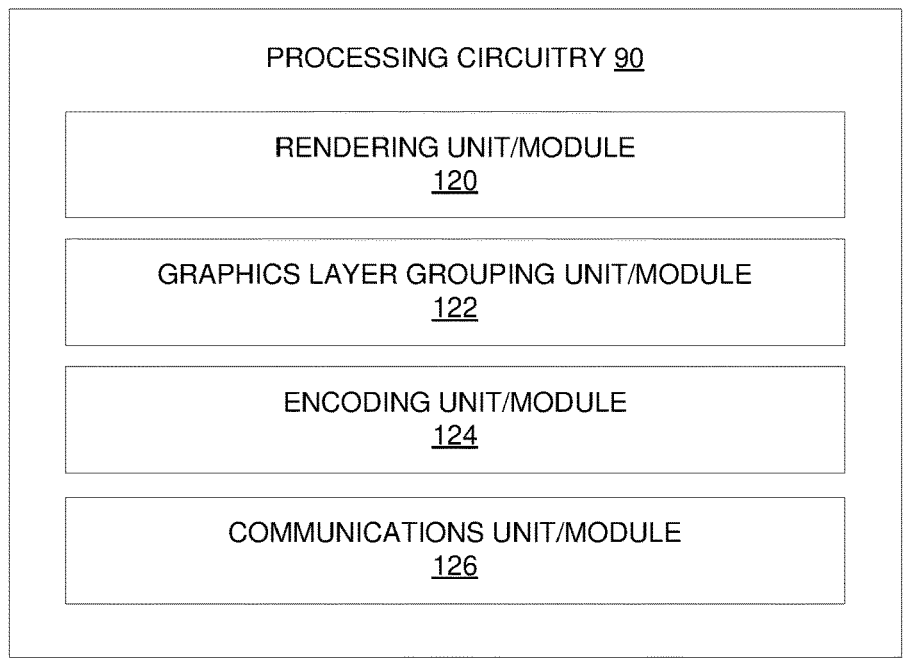
FIG. 9 is a schematic block diagram illustrating some exemplary functional components of a server node configured to reduce undesirable visual artifacts, such as judder, in an image according to one embodiment of the present disclosure.

FIG. 9 illustrates the processing circuitry 90 for an exemplary server node 16 configured to perform method 20 shown in FIG. 2. The processing circuitry 90 comprises a rendering unit/module 120, a graphics layer grouping unit/module 122, an encoding unit/module 124, and a communications unit/module 126. The various units/modules 120-126 can be implemented by hardware and/or by software code that is executed by a processor or processing circuitry 90.

The rendering unit/module 120 is configured to create a plurality of graphics layers comprising one or more objects by rendering the one or more objects to a number of different Z-order planes. The graphics layer grouping unit/module 122 is configured to group the plurality of graphics layers into graphics layer groups based on the Z-order of the graphics layers and motion information for the one or more objects. The encoding unit/module 124 is configured to encode the graphics layer groups separately into a composite video frame such that each graphics layer group is separately decodable, and the composite video frame includes the motion information. The communications unit/module 126 is configured to send the encoded composite video frame to HMD 18, and further, to receive sensor signals and indications regarding the user's head movement from HMD 18.

Figure 10:
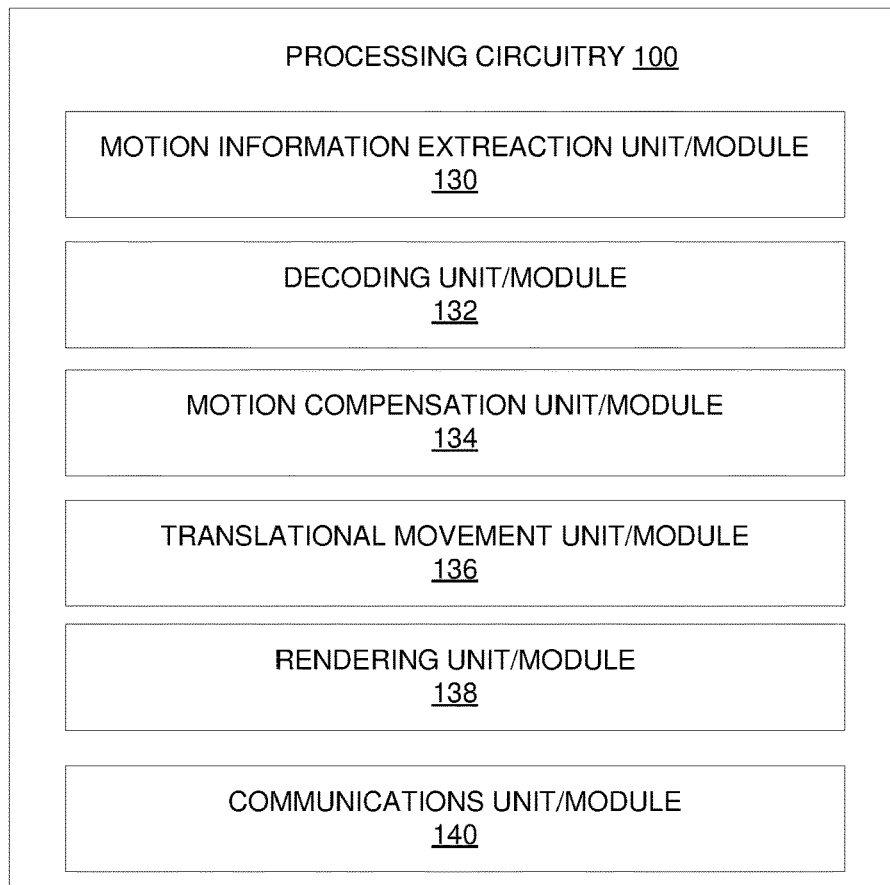
FIG. 10 is a schematic block diagram illustrating some exemplary functional components of a client device configured to reduce undesirable visual artifacts, such as judder, in an image according to one embodiment of the present disclosure.

FIG. 10 illustrates the processing circuitry 100 for an exemplary HMD 18 configured to perform method 40 shown in FIG. 3. The processing circuitry 100 comprises a motion information extraction unit/module 130, a decoding unit/module 132, a motion compensation unit/module 134, a translational movement unit/module 136, a rendering unit/module 138, and a communications unit/module 140. The various units/modules 130-140 can be implemented by hardware and/or by software code that is executed by a processor or processing circuitry 100.

The motion information extraction unit/module 130 is configured to extract the motion information from a composite video frame received from a server node 16. The composite video frame comprises one or more graphics layer groups, as described above. The decoding unit/module 132 is configured to separately decode each graphics layer group in the composite video frame into a plurality of graphics layers. The motion compensation unit/module 134 is configured to compensate for motion of the objects in the graphics layers based on the motion information for the objects. The translational movement unit/module 136 is configured to compensate the object for movement of a user's head based on the Z-order information. The rendering unit/module 138 is configured to render the plurality of graphics layers on a display to the user, and the communications unit/module 140 is configured to receive the composite video frames from server node 14, and to send sensor signals and indications regarding the user's head movement to the server node 14.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

What is claimed is:

1. A method for generating composite video frames at a server node in an Edge Data Network (EDN), for decoding and displaying at a remote client device, the composite video frames depicting a three-dimensional (3D) scene having one or more 3D objects, the method reducing undesirable visual effects in a corresponding video image displayed by the remote client device and comprising, for each composite video frame:
  rendering the 3D scene to Z-order planes, with each 3D object assigned to a corresponding Z-order plane according to a Z-order distance of the 3D object;
  creating a plurality of graphics layers, each graphics layer corresponding to a respective one of the Z-order planes, and each graphics layer having corresponding 3D motion information for each 3D object in the respective Z-order plane, and wherein different 3D objects in the respective Z-order plane having different 3D motion information are assigned to respective graphics layer groups of the corresponding graphics layer; and
  encoding the graphics layer groups separately into a composite video frame such that:
    each graphics layer group is separately decodable;
    the composite video frame includes the 3D motion information corresponding to each graphics layer group; and
  sending the composite video frame to the remote client device for decoding, according to the graphics layer groupings and the 3D motion information corresponding to each of the one or more 3D objects.

2. The method of claim 1, wherein the 3D motion information for each 3D object comprises a corresponding 3D velocity vector and a 3D direction vector.

3. The method of claim 1, further comprising adding the 3D motion information corresponding to each 3D object as meta-information to the composite video frame.

4. The method of claim 3, wherein the meta-information comprises:
  an identity for each graphics layer in the composite video frame;
  the 3D motion information for each 3D object in each graphics layer; and
  a Z-order position of each graphics layer in the composite video frame.

5. The method of claim 1, wherein the number of Z-order planes is predetermined.

6. A method of operation by a client device, the method comprising:
  receiving composite video frames from a remote server node in an Edge Data Network (EDN); and
  for each composite video frame:
    extracting three-dimensional (3D) motion information from the composite video frame, wherein the composite video frame was generated based on the remote server node rendering a 3D scene containing one or more 3D objects to Z-order planes, with each 3D object assigned to a corresponding Z-order plane according to a Z-order distance of the 3D object, and creating a plurality of graphics layers, each graphics layer corresponding to a respective one of the Z-order planes, and each graphics layer having 3D motion information corresponding to each 3D object in the respective Z-order plane, and wherein different 3D objects in the respective Z-order plane having different 3D motion information belong to respective graphics layer groups of the corresponding graphics layer;
    decoding the composite video frame into the plurality of graphics layers, including separately decoding each graphics layer group of each graphics layer;
    determining a latency time based on a time stamp of the composite video frame and a current rendering time;
    correcting positions of the respective graphics layers based on the latency time and the 3D motion information corresponding to the one or more 3D objects, and wherein the correcting accounts for movement in the image plane and in a Z-order direction; and
    rendering the corrected plurality of graphics layers on a display to the user.

7. A server node in an Edge Data Network (EDN), the server node comprising:
  communications interface circuitry configured to communicate with a client device operatively connected to the EDN; and
  processing circuitry configured to:
    render the 3D scene to Z-order planes, with each 3D object assigned to a corresponding Z-order plane according to a Z-order distance of the 3D object;
    create a plurality of graphics layers, each graphics layer corresponding to a respective one of the Z-order planes, and each graphics layer having 3D motion information for each 3D object in the respective Z-order plane, and wherein different 3D objects in the respective Z-order plane having different 3D motion information are assigned to respective graphics layer groups of the corresponding graphics layer;
    encode the graphics layer groups separately into a composite video frame such that each graphics layer group is separately decodable and the composite video frame includes the 3D motion information corresponding to each graphics layer group; and
    send the composite video frame to the client device for decoding, according to the graphics layer groupings and the 3D motion information corresponding to each of the one or more 3D objects.

8. A client device comprising:
  communications interface circuitry configured to communicate with a server node in an Edge Data Network (EDN); and
  processing circuitry configured to:
    receive composite video frames from the server node; and
    for each composite video frame:
      extract three-dimensional (3D) motion information from the composite video frame, wherein the composite video frame was generated based on the remote server node rendering a 3D scene containing one or more 3D objects to Z-order planes, with each 3D object assigned to a corresponding Z-order plane according to a Z-order distance of the 3D object, and creating a plurality of graphics layers, each graphics layer corresponding to a respective one of the Z-order planes, and each graphics layer having 3D motion information corresponding to each 3D object in the respective Z-order plane, and wherein different 3D objects in the respective Z-order plane having different 3D motion information belong to respective graphics layer groups of the corresponding graphics layer;
      decode the composite video frame into the plurality of graphics layers, including separately decoding each graphics layer group of each graphics layer:
      determine a latency time based on a time stamp of the composite video frame and a current rendering time;
      correct positions of the respective graphics layers based on the latency time and the 3D motion information corresponding to the one or more 3D objects, and wherein the correcting accounts for movement in the image plane and in a Z-order direction; and render the corrected plurality of graphics layers on a display to the user.

\* \* \* \* \*